United States Patent
Agarwal et al.

(10) Patent No.: US 9,069,763 B2
(45) Date of Patent: Jun. 30, 2015

(54) SERVICES MANAGEMENT APPLICATION INTEGRATING SOCIAL MEDIA AND AUTOMATED INFRASTRUCTURE MONITORING

(75) Inventors: Charu Agarwal, New Delhi (IN); Shadi E. Albouyeh, Raleigh, NC (US); Paulo Henrique de Almeida Cavoto, Campinas (BR); Mamatha Gowda, London (GB); Wim A. Harthoorn, Horsham (GB); Asmeeta N. Mandapaka, Pune (IN); Sunjit Tara, Budd Lake, NJ (US); Sean Young, New Malden (GB)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/540,298

(22) Filed: Jul. 2, 2012

(65) Prior Publication Data
US 2014/0006601 A1    Jan. 2, 2014

(51) Int. Cl.
*G06F 15/173* (2006.01)
*G06F 11/30* (2006.01)
*G06F 11/32* (2006.01)
(Continued)

(52) U.S. Cl.
CPC ............ *G06F 11/30* (2013.01); *G06F 11/3051* (2013.01); *G06F 11/3055* (2013.01); *G06F 11/3065* (2013.01); *G06F 11/328* (2013.01); *G06F 11/3409* (2013.01); *G06Q 30/00* (2013.01)

(58) Field of Classification Search
CPC .............. G06F 11/30; G06F 17/30539; G06F 17/30699; G06F 17/30867; G06F 11/3006; G06F 11/3058; G06Q 30/0201; G06Q 30/0256; G06Q 30/0269; G06Q 30/02; H04L 41/5067; H04L 41/5016
See application file for complete search history.

(56) References Cited

U.S. PATENT DOCUMENTS

| | | | |
|---|---|---|---|
| 7,974,983 B2 * | 7/2011 | Goeldi | 707/769 |
| 2007/0130208 A1 * | 6/2007 | Bornhoevd et al. | 707/104.1 |
| 2011/0125697 A1 | 5/2011 | Erhart et al. | |

(Continued)

OTHER PUBLICATIONS

Blankenhorn, "Cisco Introduces Social Customer Care Tool—The BrainYard—InformationWeek", Copyright © 2012 UBM TechWeb, Jan. 13, 2011 [online], [retrieved on Mar. 8, 2012]. Retrieved from the Internet <URL: http://www.informationweek.com/thebrainyard/news/229000665/cisco-introduces-social-customer-care-tool>.

(Continued)

*Primary Examiner* — Wing F Chan
*Assistant Examiner* — Padma Mundur
(74) *Attorney, Agent, or Firm* — Edward P. Li

(57) ABSTRACT

A method, a computer program product, and a computer system for integrating social media and infrastructure monitoring of a service provider. The method, the computer program product, and the computer system include mapping a service provided by the service provider to components of an infrastructure of the service provider, requesting a social media service to conduct a search of consumer feedback regarding the service, receiving information of the search from the social media service, evaluating the service through analyzing the information of the search, receiving status information of the infrastructure from a monitoring system of the service provider, correlating a result of evaluating the service to the status information of the infrastructure, and providing the service provider with visualization of the result that is correlated to the infrastructure.

18 Claims, 6 Drawing Sheets

(51) Int. Cl.
*G06Q 30/00* (2012.01)
*G06F 11/34* (2006.01)

(56) References Cited

U.S. PATENT DOCUMENTS

| | | | | |
|---|---|---|---|---|
| 2011/0179313 | A1* | 7/2011 | MacDonald et al. | 714/47.1 |
| 2011/0276513 | A1* | 11/2011 | Erhart et al. | 705/347 |
| 2013/0163438 | A1* | 6/2013 | Wilkinson | 370/242 |

OTHER PUBLICATIONS

Carr, "Avaya Integrates Social Media, Contact Center Products—The BrainYard—InformationWeek", Copyright © 2012 UBM TechWeb, Jul. 12, 2011 [online], [retrieved on Mar. 8, 2012]. Retrieved from the Internet <URL: http://www.informationweek.com/thebrainyard/news/social_crm/231001445/avaya-integrates-social-media-contact-center-products>.

IBM, "alphaWorks Community", developerWorks [online], [retrieved on Mar. 8, 2012]. Retrieved from the Internet <URL: https://www.ibm.com/developerworks/community/groups/service/html/communityview?communityUuid=18d10b14-e2c8-4780-bace-9af1fc463cc0>.

IBM, "IBM—DB2 database software", DB2 database software [online], [retrieved on Mar. 8, 2012]. Retrieved from the Internet <URL: http://www-01.ibm.com/software/data/db2/>.

IBM, "IBM enterprise mashups—IBM Mashup Center", IBM Mashup Center [online], [retrieved on Mar. 8, 2012]. Retrieved from the Internet <URL: http://www-01.ibm.com/software/info/mashup-center/>.

IBM, "IBM—Get the context-driven correlation, intelligence and automations functionality that operations staff need in order to streamline event and alert management, business service management, and incident and problem management.—Tivoli Netcool/Impact—Software", IBM Tivoli Netcool/Impact [online], [retrieved on Mar. 8, 2012]. Retrieved from the Internet <URL: http://www-01.ibm.com/software/tivoli/products/netcool-impact/>.

IBM, "Many Eyes : Tour", IBM Research and the IBM Cognos software group [online], [retrieved on Mar. 8, 2012]. Retrieved from the Internet <URL: http://www-958.ibm.com/software/data/cognos/manyeyes/page/Tour.html>.

IBM, "IBM—Operations Management Software—Tivoli Netcool/OMNIbus—Software", IBM Tivoli® Netcool®/OMNIbus [online], [retrieved on Mar. 8, 2012]. Retrieved from the Internet <URL: http://www-01.ibm.com/software/tivoli/products/netcool-omnibus/>.

IBM, "IBM Software—Network Manager", IBM® Tivoli® Network Manager [online], [retrieved on Mar. 8, 2012]. Retrieved from the Internet <URL: http://www-01.ibm.com/software/tivoli/products/network-mgrproductline/>.

* cited by examiner

SERVICES MANAGEMENT APPLICATION INTEGRATING SOCIAL MEDIA AND AUTOMATED INFRASTRUCTURE MONITORING

FIELD OF THE INVENTION

The present invention relates generally to management of a service provider in the IT industry, and more particularly to a services management application which integrates social media and automated infrastructure monitoring of the service provider.

BACKGROUND

Customers of services provided by service providers have perceptions of the deliveries of the services. The perceptions drive decisions of the customers on whether to buy, renew, extend or terminate the services delivered by the service providers. Also, how the perceptions are reported to peers influences the decisions of the customers.

Most service providers in the IT industry have sophisticated tools to monitor the performance of their infrastructures. The monitoring tools allow developers and engineers of the infrastructures to diagnose and fix issues in the deliveries of the services provided by the service providers. However, the sophisticated tools for monitoring the performance of the service providers do not reveal the perceptions of the consumers. The perceptions cannot be used to direct the developers and engineers to fix issues.

Social media services include web-based and mobile technologies to turn communication into interactive dialogue between organizations, communities, and individuals. Thus, the social media services provide potential sources of data on the perceptions of the consumers. A communication system can be established for conducting interaction with the customers who use a social media service. For example, in US Pat. Pub. No. 2011/0125697 A1 (Erhart et al., 2011), the communication system is operable to interact with customers across different social media networks, and in US Pat. Pub. No. 2011/0276513 A1 (Erhart et al., 2011), methods and systems provide an enterprise with the ability to conduct automated customer feedback surveys.

SUMMARY

Embodiments of the present invention provide a method, computer program product, and computer system for integrating social media and infrastructure monitoring of a service provider. In the method, computer program product, and computer system, at least one computer maps a service provided by the service provider to components of an infrastructure of the service provider. The at least one computer requests a social media service to conduct a search of consumer feedback regarding the service, wherein the consumer feedback is posted on the social media service. The at least one computer receives information of the search from the social media service. The at least one computer evaluates the service through analyzing the information of the search. The at least one computer receives status information of the infrastructure from a monitoring system of the service provider. The at least one computer correlates a result of evaluating the service to the status information of the infrastructure. And, the at least one computer provides the service provider with visualization of the result that is correlated to the infrastructure.

DETAILED DESCRIPTION

Although most service providers have sophisticated tools to monitor the performance of their infrastructure, the tools do not reveal perceptions of consumers of the service providers. Social media services provide potential sources of data on perceptions of the consumers, as well as providing a direct means of communication between consumers and the service providers. But, there is still a mismatch between how the customers describe their perceptions at social media services and how the developers and engineers view their technology of the service providers. Embodiments of the present invention seek to map the output from social media analysis to infrastructure monitoring so that the service providers can not only detect changes in the perceptions but also direct the developers and engineers to fix issues of the service providers.

A method, a system, and a program product for a services management application integrating social media and automated infrastructure monitoring of service providers are described in detail in the following exemplary embodiments. The description of various exemplary embodiments of the present invention is presented for purposes of illustration and description. It is neither intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 1:
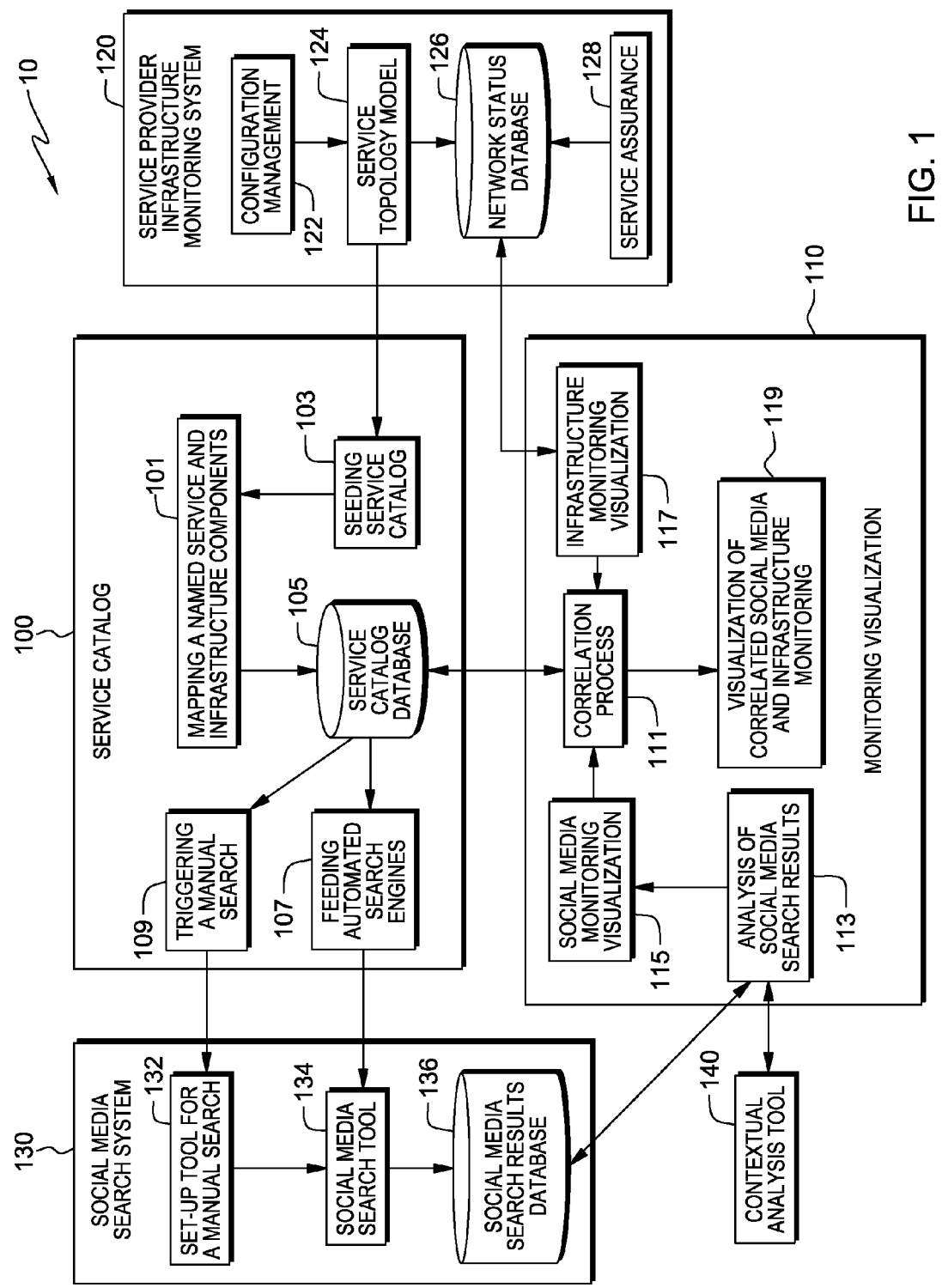
FIG. 1 is a diagram illustrating a distributed data processing environment of a services management application which integrates social media and automated infrastructure monitoring of a service provider, in accordance with an embodiment of the present invention.

FIG. 1 is a diagram illustrating a distributed data processing environment 10 of a services management application which integrates a social media search system 130 and a service provider infrastructure monitoring system 120, in accordance with an embodiment of the present invention. Referring to FIG. 1, a service catalog 100 and monitoring visualization 110 are two components of the services management application in the present invention. Service catalog 100 comprises a process 101 for mapping a named service and infrastructure components, a process 103 for seeding service catalog, a process 107 for feeding automated search engines, a process 109 for triggering a manual search, and a service catalog database 105. Monitoring visualization 110 comprises a correlation process 111, a process 113 for analysis of social media search results, a process 115 for social media monitoring visualization, a process 117 for infrastructure monitoring visualization, and a process 119 for visualization of correlated social media and infrastructure monitoring. Service catalog 100 is what drives social media search system 130 and provides the correlation data to allow monitoring visualization 110 to tie the infrastructure monitoring to the results of the social media search.

Social media search system 130 is included in a social media service. The social media service may include a group of Internet-based applications and allow the creation and exchange of user-generated content. Examples of the social media service are Twitter® and Facebook®. Social media search system 130 comprises a set-up tool 132 for a manual search, a social media search tool 134, and a social media search results database 136. Set-up tool 132 for a manual search receives, from process 109 for triggering a manual search, a request for a manual search of consumer feedback regarding a service provided by a service provider, links to entries of service catalog database 105, and requests social media search tool 134 to conduct the manual search. Social media search tool 134 conducts the search based on mapping information provided by service catalog 100. Social media search tool 134 does not only conduct search according to the manual search request but also conducts an automated search of consumer feedback regarding the service provided by the service provider. To conduct the automated search, social media search tool 134 receives automated search engines fed from process 107 for feeding automated search engines in service catalog 100. Social media searches are done using the named services as keys. Social media search results database 136 stores results of the social media search and is accessible to the services management application. Specifically, social media search results database 136 is accessible to process 113 for analysis of social media search results.

Referring to FIG. 1, service provider infrastructure monitoring system 120 is located at an operation center of a service provider. Service provider infrastructure monitoring system 120 comprises configuration management 122, a service topology model 124, a network status database 126, and service assurance 128. Configuration management 122 discovers the network topology and dependencies of the service provider. Configuration management 122 also has capability to configure the network topology and dependencies through manual entry. Service topology model 124 is a data model that links infrastructure components and sub-assemblies to each other according to the network topology and dependencies. The components of the infrastructure are hardware and software used to deliver the named service by the service provider; for example, the components may be individual network routers, virtual private networks, servers, applications, etc. Sub-assemblies may include the stack of servers in a high availability configuration, such as delivering the secure login function for a delivered service, and a virtual circuit that links an external content provider to the service provider. The infrastructure is modeled as a range of functional components. The model includes details that allow the documentation of the creation and operation of the service through stringing these functions together, but are sufficiently distant from the infrastructure so that routine changes of hardware or networking do not impact on the model. Service assurance 128 provides performance management of the infrastructure of the service provider. Network status database 126 stores information of the data model as well as information of the performance of the service provider.

Referring to FIG. 1, process 101 for mapping a named service and infrastructure components defines mapping between components of infrastructure and the named service. The named service is provided by the service provider and has at least one formal marketing name which can be identified by the consumers. A key function of process 101 for mapping a named service and infrastructure components is to link marketing name(s) and/or unofficial popular name(s) of the service to the internal naming that is meaningful to developers and engineers for the service provider. Process 101 for mapping a named service and infrastructure components constructs service catalog database 105. Service topology model 124 in service provider infrastructure monitoring system 120 is seeded to process 101 for mapping a named service and infrastructure components by process 103 for seeding service catalog. Process 107 for feeding automated search engines in service catalog 100 sends a request for the automated search to social media search tool 134 in social media search system 130. To prompt the manual search at the social media service, process 109 for triggering a manual search in service catalog 100 sends a request for the manual search to social media search tool 134 through set-up tool 132 for a manual search. Service catalog database 105 contains details of all the services provided by the service provider, either hardware or software, in an extendable list. Along with the core services, all the sub services and the linkage between their popular names and official names are stored in service catalog database 105. Also, service catalog database 105 stores results of analyzing the social media search information and correlating the social media search information to status information of service provider infrastructure. In addition, service catalog database 105 stores the different modes (e.g. broadband or 3G mobile) in which the services are made available to consumers. Information stored in service catalog database 105 can be modified and updated at anytime. The information stored in service catalog database 105 is able to react to fuzzy searching. Service catalog database 105 is accessible to correlation process 111 in monitoring visualization 110. Service catalog database 105 holds the high level correlation data.

It is not intended for service catalog database 105 to list every node in the infrastructure or service delivery network but to access federated data in the existing provisioning and management systems of service providers. Therefore, service catalog database 105 destructs each of the services into three layers: first, a top level service that relates to the service a consumer has signed up; second, functional components that delivers the service; and third, items such as devices, servers, and locations, which can be used to filter and select many alarms and views available in main network management systems of the service providers. The top level service of the first layer will be listed in a summary report in response to analysis of the search information provided by social media search system 130. The second layer allows a URL to be constructed that will call up a network or systems management view of the service delivery chain, with alarms and status indications of its health. The third layer allows for correlation between multiple top level services that share common components, for example a link to a content provider.

In another embodiment, service catalog 100 may include a tool for establishing the infrastructure service topology model if service topology model 124 is not available in service provider infrastructure monitoring system 120. The establishment of the infrastructure service topology model may be implemented by process 103 for seeding service catalog or process 101 for mapping a named service and infrastructure components.

In monitoring visualization 110, process 113 for analysis of social media search results retrieves the search results stored in social media search results database 136 and analyzes the information of the search results. Through process 113 for analysis of social media search results, the service provided by the service provider is evaluated by scoring according to consumer negative or positive perceptions of the service. Responsive to the analysis completed by process 113 for analysis of social media search results, process 115 for social media monitoring visualization provides an overview or summary of analysis of search information collected by social media search system 130. Process 117 for infrastructure monitoring visualization retrieves status information from network status database 126 in service provider infrastructure monitoring system 120, and provides an overview or summary of the operational status of the hardware and software that underpin the service delivery.

Responsive to receiving the overview or the summary from process 115 for social media monitoring visualization and receiving the overview or the summary from process 117 for infrastructure monitoring visualization, correlation process 111 queries service catalog database 105 and correlates terms in the overview or the summary to status information of the infrastructure components and/or sub-assemblies. Responsive to the correlation done by correlation process 111, process 119 for visualization of correlated social media and infrastructure monitoring provides combined visualization which links the overview or the summary of the social media search to the relevant infrastructure status.

Referring to FIG. 1, a contextual analysis tool 140 is used to analyze the consumer feedback, according to embodiments in which the automated search is triggered by process 107 for feeding automated search engines.

Figure 2:
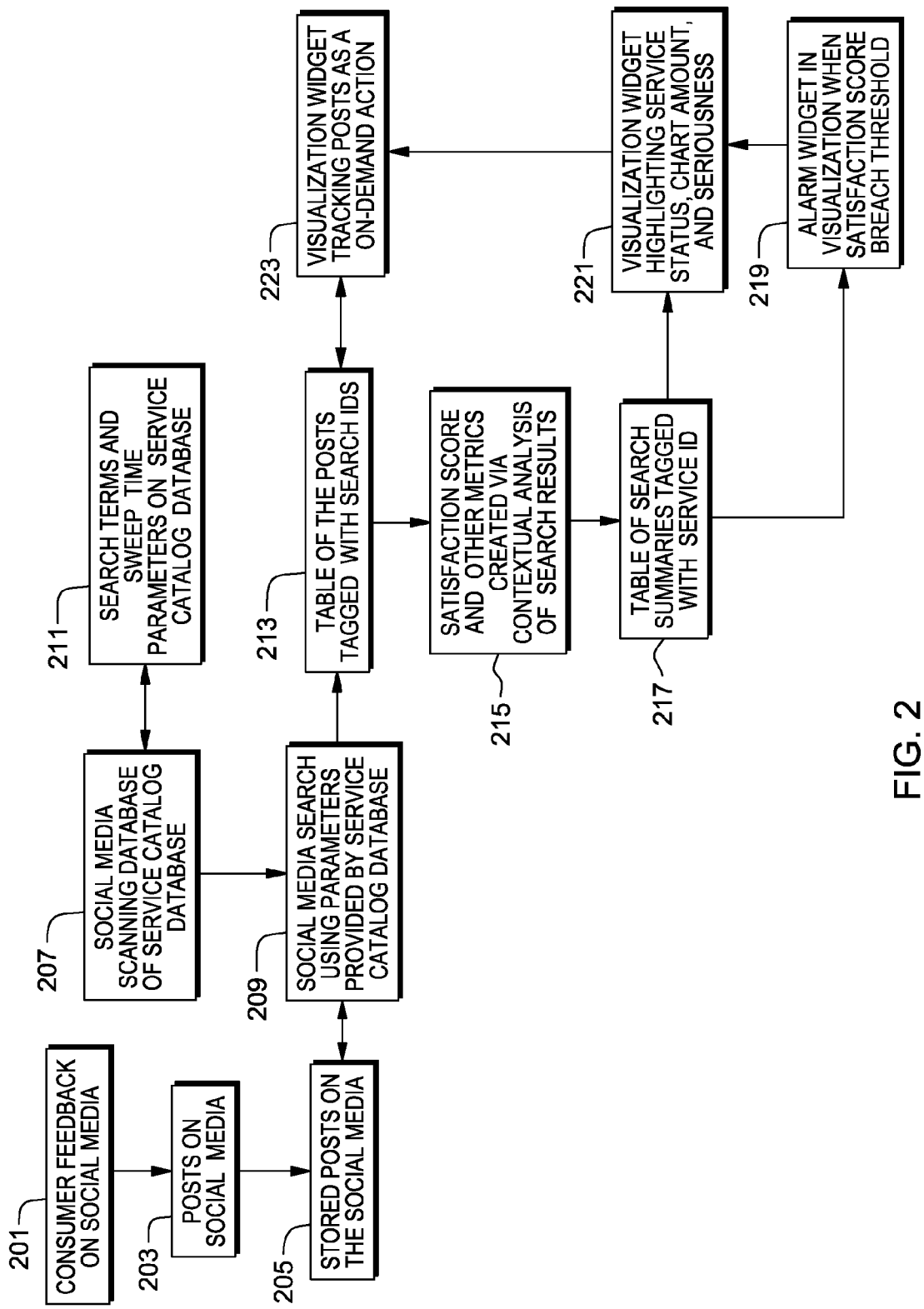
FIG. 2 is a diagram illustrating exemplary data flows from a social media search system, in which automated search engines are fed to the social media search system by a service catalog, in accordance with an embodiment of the present invention.

FIG. 2 is a diagram illustrating exemplary data flows from social media search system 130 (shown in FIG. 1), in which automated search engines are fed to social media search system 130 by service catalog 100 (shown in FIG. 1), in accordance with an embodiment of the present invention. Referring to block 201, consumers input feedback on a social media service. For example, the consumers post their perceptions of services provided by service providers on social media website Twitter®. Referring to block 203, the consumer feedback is published as posts on the social media service. For example, the feedback is posted on Twitter® to be available for view by followers. Referring to block 205, the posts are stored on the social media service. Referring to block 207, responsive to a request for an automated search, social media search tool 134 (shown in FIG. 1) scans parameters stored in service catalog database 105 (shown in FIG. 1). For example, for running the automated search, a Twitter® search applet scans service catalog database 105. Referring to block 211, the parameters scanned by social media search tool 134 include search terms and search sweep time. Referring to block 209, the automated search is run by social media search tool 134, using the parameters provided by service catalog database 105. Referring to block 213, a table of individual posts tagged with search IDs is provided. Referring to block 215, satisfaction scores and other metrics are provided based on analysis of consumer feedback; the analysis uses contextual analysis tool 140 (shown in FIG. 1). Referring to block 217, a table of search summaries is provided. The summaries include social media search data records and are tagged with service IDs. Referring to block 219, a background process in monitoring visualization 110 (shown in FIG. 1) triggers alarm widgets when the satisfaction scores breach a threshold. Referring to block 221, monitoring visualization 110 triggers visualization widgets to highlight service status, chart amount, and seriousness reported in the search summaries. Referring to block 223, as an on-demand action, monitoring visualization 110 also triggers visualization widgets to track the individual posts on social media search system 130.

Figure 3:
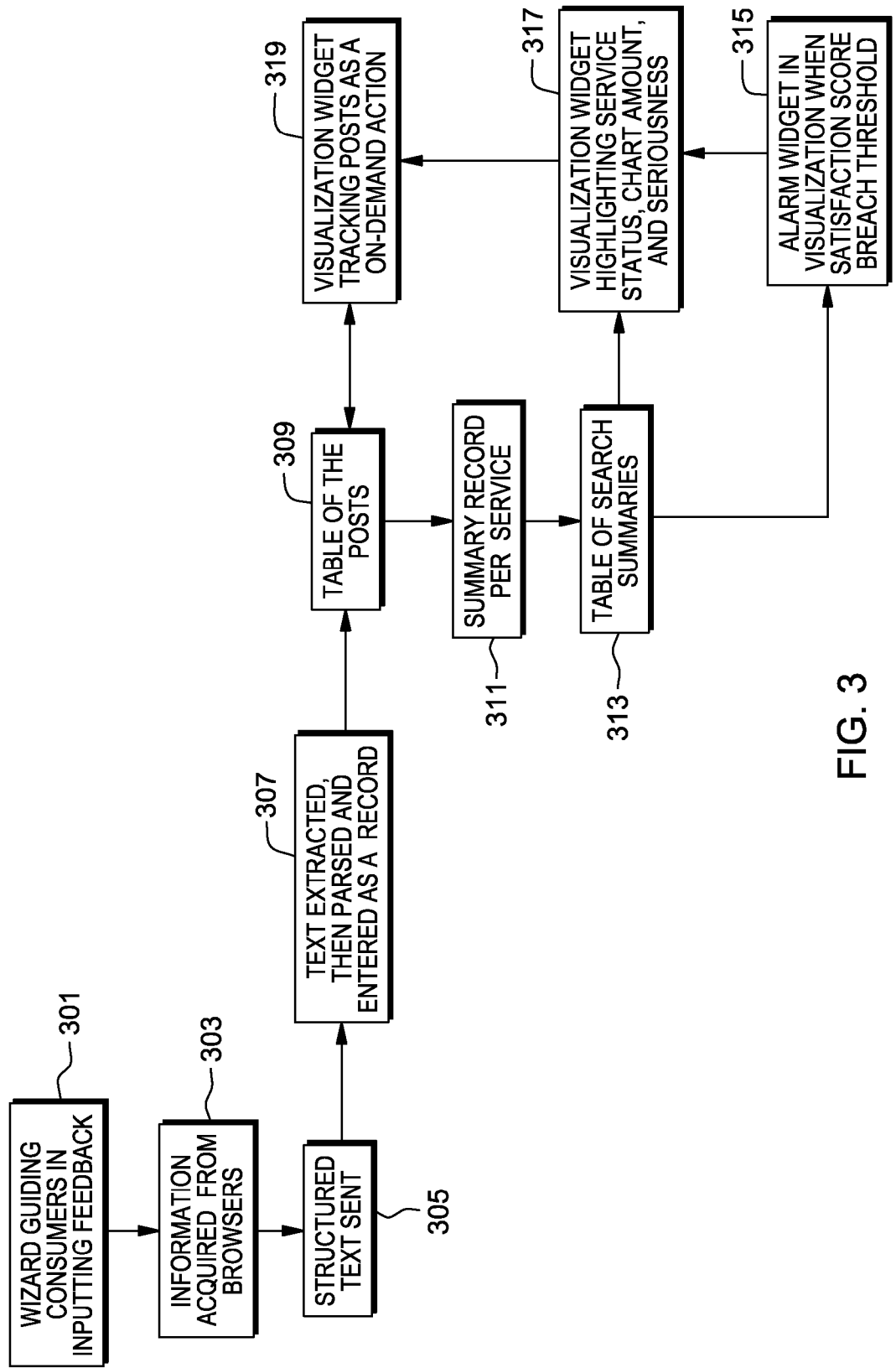
FIG. 3 is a diagram illustrating exemplary data flows from a social media search system, in which a manual search is triggered by a service catalog, in accordance with another embodiment of the present invention.

FIG. 3 is a diagram illustrating exemplary data flows from social media search system 130 (shown in FIG. 1), in which a manual search is triggered by service catalog 100 (shown in FIG. 1), in accordance with another embodiment of the present invention. Referring to block 301, responsive to a request for the manual search by process 109 (shown in FIG. 1) for triggering a manual search, set-up tool 132 (shown in FIG. 1) for a manual search provides a wizard to guide consumers in inputting feedback. Referring to block 303, set-up tool 132 for a manual search acquires information from browsers used by consumers, and the information includes, for example, IP addresses, browser types, media player types, etc. Referring to block 305, set-up tool 132 for a manual search sends structured texts of the feedback to social media search tool 134 (shown in FIG. 1). Referring to block 307, social media search tool 134 extracts the structured texts. The extracted texts are parsed and entered as records in social media search results database 136 (shown in FIG. 1). The records are then published as posts on the social media service website. Referring to block 309, a table of individual posts is provided. Each of the posts is represented by a separated data record. Referring to block 311, a background process of social media search results database 136 produces a summary record per service and updates the summary report for a monitoring period specified for the service. Referring to block 313, a table of search summaries is provided. Referring to block 315, a background process in monitoring visualization 110 (shown in FIG. 1) triggers alarm widgets when the satisfaction scores breach a threshold. Referring to block 317, monitoring visualization 110 triggers visualization widgets to highlight service status, chart amount, and seriousness reported in the search summaries. Referring to block 319, as an on-demand action, monitoring visualization 110 also triggers visualization widgets to track the individual posts on social media search system 130.

Figure 4:
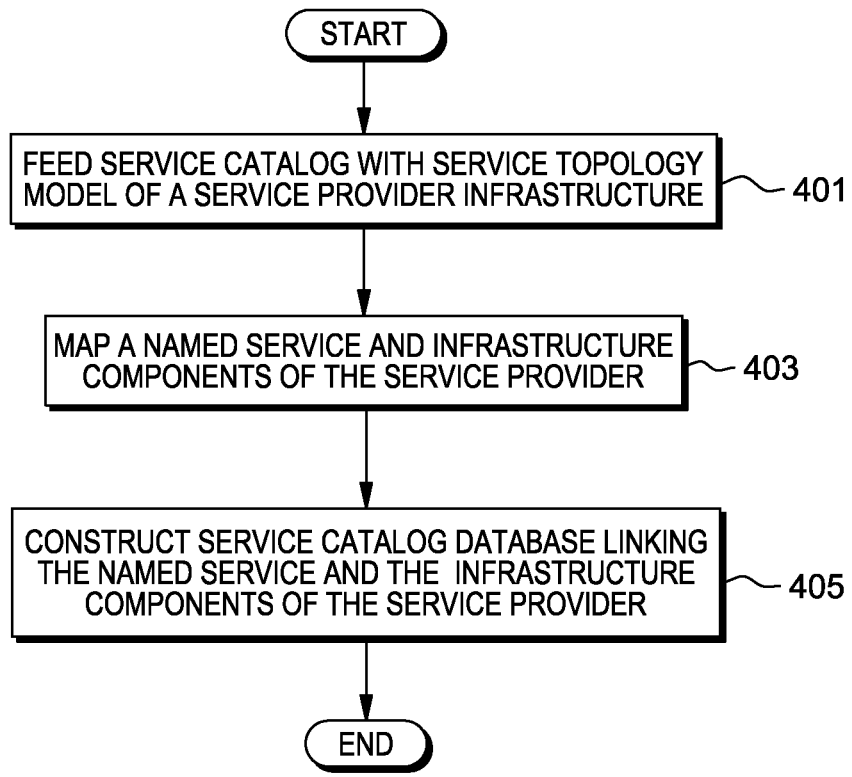
FIG. 4 is a diagram illustrating an exemplary procedure to construct a service catalog database which links a named service and infrastructure components of a service provider, in accordance with an embodiment of the present invention.

FIG. 4 is a diagram illustrating an exemplary procedure to construct service catalog database 105 (shown in FIG. 1), in accordance with an embodiment of the present invention. At step 401, process 103 (shown in FIG. 1) for seeding service catalog feeds service topology model 124 (shown in FIG. 1) of an infrastructure of a service provider to service catalog 100 (shown in FIG. 1). Service topology model 124 is a model that links infrastructure components and sub-assemblies to each other according to the network topology and dependencies. At step 403, process 101 (shown in FIG. 1) for a mapping named service and infrastructure components maps marketing name(s) and/or unofficial popular name(s) of a service to infrastructure components of the service provider, thus linking the marketing name(s) and/or unofficial name(s) of the service to the internal naming that is meaningful to developers and engineers for the service provider. A key function of process 101 for mapping a named service and infrastructure components is to link marketing name(s) and/or unofficial popular name(s) of the service to the internal naming that is meaningful to developers and engineers for the service provider. Another key function of process 101 for mapping a named service and infrastructure components is to construct service catalog database 105. At step 405, based on the mapping at step 403, process 101 for mapping a named service and infrastructure components constructs service catalog database 105 which links the named service and the infrastructure components of the service provider.

In other embodiments, service topology model 124 is not available in service provider infrastructure monitoring system 120. Step 401 of "feed service catalog with service topology model of a service provider infrastructure" in FIG. 4 will be replaced by a step of "establish a service topology model of a service provider infrastructure". In these situations, the establishment of the service topology model is implemented by process 103 for seeding service catalog or process 101 for mapping a named service and infrastructure components.

Figure 5:
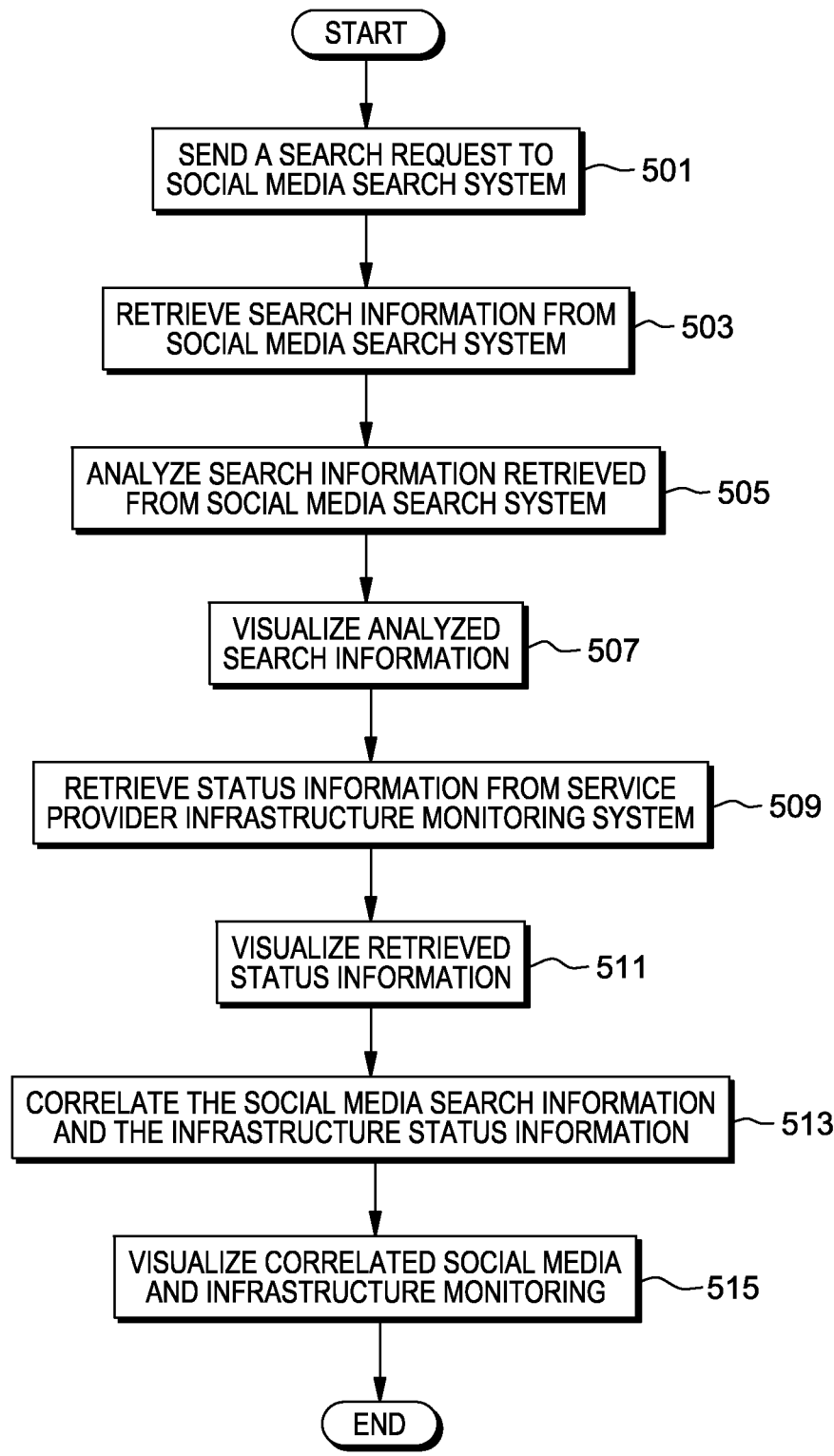
FIG. 5 is a diagram illustrating an exemplary procedure to integrate social media and automated infrastructure monitoring of a service provider, in accordance with an embodiment of the present invention.

FIG. 5 is a diagram illustrating an exemplary procedure to integrate social media and automated infrastructure monitoring of a service provider, in accordance with an embodiment of the present invention. At step 501, service catalog 100 (shown in FIG. 1) in the services management application sends a request for a search to social media search system 130 (shown in FIG. 1). The request may be either a request for an automated search sent from process 107 (shown in FIG. 1) for feeding automated search engines or a request for a manual search sent from process 109 (shown in FIG. 1) for triggering a manual search. For the automated search, an algorithm in the search engines picks the relevant keywords that can help administrators to create social media searches quickly. These will typically be the marketing name(s) of the service; however, there may need to be greater detail provided, for example, consumer reactions to individual programs or downloads carried by the service. Some searches may be triggered manually by process 109 for triggering a manual search. At step 503, process 113 (shown in FIG. 1) for analysis of social media search results retrieves search information from social media search results database 136 (shown in FIG. 1) in social media search system 130. The search information includes the results of searching consumer feedback posted on the social media service. At step 505, process 113 for analysis of social media search results analyzes the retrieved search information. In the analysis, the service provided by the service provider is evaluated by scoring according to consumer negative or positive perceptions of the service. Satisfaction scores and other metrics are provided based on the analysis. The analysis may also use contextual analysis tool 140 (shown in FIG. 1). At step 507, process 115 (shown in FIG. 1) for social media monitoring visualization provides visualization of the analyzed search results through providing an overview or a summary. At step 509, process 117 (shown in FIG. 1) for infrastructure monitoring visualization retrieves status information from network status database 126 (shown in FIG. 1) in service provider infrastructure monitoring system 120 (shown in FIG. 1). At step 511, process 117 for infrastructure monitoring visualization provides visualization of the retrieved status information by providing an overview or summary of the operational status of the hardware and software that underpin service delivery. At step 513, correlation process 111 (shown in FIG. 1) correlates the social medial search information and the infrastructure status information. In the correlation, terms in the overview or the summary are correlated to status information of the infrastructure components and/or sub-assemblies. At step 515, process 119 (shown in FIG. 1) for visualization of correlated social media and infrastructure monitoring provides combined visualization linking the overview or the summary of analyzed social media search results to the relevant infrastructure status of the service provider.

Figure 6:
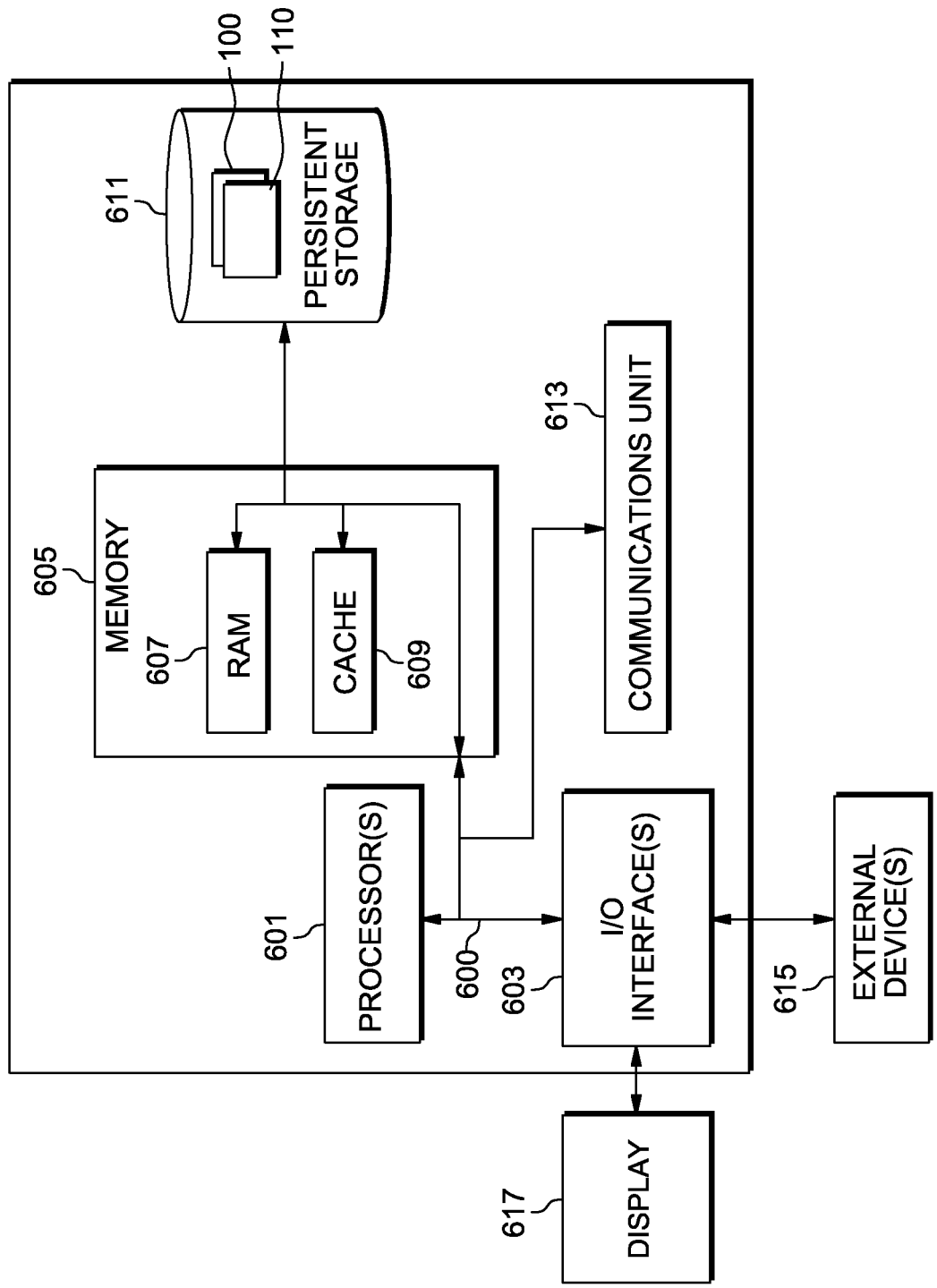
FIG. 6 is a diagram of hardware and software of a computer hosting a services management application, in accordance with an embodiment of the present invention.

FIG. 6 presents a diagram of hardware and software of a computer hosting the services management application, in accordance with an embodiment of the present invention. It should be appreciated that FIG. 6 provides only an illustration of one implementation and does not imply any limitations with regard to the environment in which different embodiments may be implemented. Many modifications to the depicted environment may be made.

The computer hosting the services management application includes communications fabric 600, which provides communications between processor(s) 601, memory 605, persistent storage 611, communications unit 613, and input/output (I/O) interface(s) 603.

Memory 605 may include, for example, one or more random access memories (RAM) 607, cache memory 609, or any other suitable volatile or non-volatile storage device. RAM 607, cache memory 609, and persistent storage 611 are examples of computer-readable tangible storage devices. A storage device is any piece of hardware that is capable of storing information, such as data, program code in functional form, and/or other suitable information, on a temporary basis and/or permanent basis.

Service catalog 100 and monitoring visualization 110 (shown in FIG. 1), two components of the services management application, are stored in persistent storage 611 for execution by processor(s) 601 via memory 605. In the embodiment illustrated in FIG. 6, persistent storage 611 includes flash memory. Persistent storage 611 may alternatively or additionally include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 611 may also be removable. For example, a removable hard drive may be used for persistent storage 611. Other examples include an optical or magnetic disk that is inserted into a drive for transfer onto another storage device that is also a part of persistent storage 611, or other removable storage devices such as a thumb drive or smart card.

Communications unit 613, in these examples, provides for communications with other devices. In these examples, communications unit 613 includes one or more network interface cards. Communications unit 613 may provide communications through the use of either or both physical and wireless communications links. In another embodiment still, the computer may be devoid of communications unit 613. Service catalog 100 and monitoring visualization 110 may be downloaded to persistent storage 611 through communications unit 613.

I/O interface(s) 603 allows for input and output of data with other devices that may be connected to the computer hosting the services management application. For example, I/O interface(s) 603 may provide a connection to external device(s) 615 such as a camera, a mouse, a keyboard, a keypad, a touch screen, and/or some other suitable input device. I/O interface(s) 603 also connect to display 617.

Display 617 is a mechanism to display data to a user and may be, for example, a computer monitor. Alternatively, display 617 may be a display that is integral to the computer and may also function as a touch screen.

The aforementioned programs can be written in various programming languages (such as Java® or C++) including low-level, high-level, object-oriented or non object oriented languages. Alternatively, the functions of the aforementioned programs can be implemented in whole or in part by computer circuits and other hardware (not shown).

Based on the foregoing, a method, computer system, and computer program product have been disclosed for a services management application integrating social media and automated infrastructure monitoring of the service providers. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. Therefore, the present invention has been disclosed by way of example and not limitation.

What is claimed is:

1. A method implemented by at least one computer for integrating social media and infrastructure monitoring of a service provider, the method comprising:
    establishing a service topology model of an infrastructure of the service provider and seeding a service catalog based on the service topology model;
    mapping a named service provided by the service provider to components of the infrastructure of the service provider based on the service topology model;
    constructing a service catalog database linking the named service and the components of the infrastructure of the service provider, wherein the service catalog database comprises information of hardware and software of services provided by the service provider;
    requesting a social media service to conduct a search of consumer feedback regarding the service, wherein the consumer feedback is posted on the social media service;
    retrieving information of the search from the social media service;
    analyzing the information of the search retrieved from the social media service;
    retrieving status information of the infrastructure from a network status database on a monitoring system of the service provider;
    correlating the information of the search retrieved from the social media service to the status information of the infrastructure, wherein terms in the information of the search retrieved from the social media service are correlated to the components of the infrastructure of the service provider; and
    providing the service provider with visualization of a result of correlating the information of the search retrieved from the social media service to the status information of the infrastructure.

2. The method of claim 1, further comprising:
    providing visualization of the information of the search, in response to receiving the information of the search from the social media service.

3. The method of claim 1, further comprising:
    providing visualization of the status information of the infrastructure, in response to receiving the status information of the infrastructure from the monitoring system of the service provider.

4. The method of claim 1, further comprising:
    feeding automated search engines to the social media service.

5. The method of claim 1, further comprising:
    prompting a manual search at the social media service.

6. The method of claim 1, further comprising:
    receiving a service topology model of the infrastructure from the service provider.

7. A computer program product to integrate social media and infrastructure monitoring of a service provider, the computer program product comprising:
    one or more computer-readable tangible storage devices and program instructions stored on at least one of the one or more tangible storage devices, the program instructions comprising:
    program instructions to establish a service topology model of an infrastructure of the service provider and seeding a service catalog based on the service topology model;
    program instructions to map a named service provided by the service provider to components of the infrastructure of the service provider based on the service topology model;
    program instructions to construct a service catalog database linking the named service and the components of the infrastructure of the service provider, wherein the service catalog database comprises information of hardware and software of services provided by the service provider;
    program instructions to request a social media service to conduct a search of consumer feedback regarding the service, wherein the consumer feedback is posted on the social media service;
    program instructions to retrieve information of the search from the social media service;
    program instructions to analyze the information of the search retrieved from the social media service;
    program instructions to retrieve status information of the infrastructure from a network status database on a monitoring system of the service provider;
    program instructions to correlate the information of the search retrieved from the social media service to the status information of the infrastructure, wherein terms in the information of the search retrieved from the social media service are correlated to the components of the infrastructure of the service provider; and
    program instructions to provide the service provider with visualization of a result of correlating the information of the search retrieved from the social media service to the status information of the infrastructure.

8. The computer program product of claim 7, further comprising:
    program instructions to provide visualization of the information of the search, in response to receiving the information of the search from the social media service.

9. The computer program product of claim 7, further comprising:
    program instructions to provide visualization of the status information of the infrastructure, in response to receiving the status information of the infrastructure from the monitoring system of the service provider.

10. The computer program product of claim 7, further comprising:
    program instructions to feed automated search engines to the social media service.

11. The computer program product of claim 7, further comprising:
    program instructions to prompt a manual search at the social media service.

12. The computer program product of claim 7, further comprising:
    program instructions to receive a service topology model of the infrastructure from the service provider.

13. A computer system to integrate social media and infrastructure monitoring of a service provider, the computer system comprising:
    one or more processors, one or more computer-readable tangible storage devices, and program instructions stored on at least one of the one or more storage devices for execution by at least one of the one or more processors, the program instructions comprising:

program instructions to establish a service topology model of an infrastructure of the service provider and seeding a service catalog based on the service topology model;

program instructions to map a named service provided by the service provider to components of the infrastructure of the service provider based on the service topology model;

program instructions to construct a service catalog database linking the named service and the components of the infrastructure of the service provider, wherein the service catalog database comprises information of hardware and software of services provided by the service provider;

program instructions to request a social media service to conduct a search of consumer feedback regarding the service, wherein the consumer feedback is posted on the social media service;

program instructions to retrieve information of the search from the social media service;

program instructions to analyze the information of the search retrieved from the social media service;

program instructions to retrieve status information of the infrastructure from a network status database on a monitoring system of the service provider;

program instructions to correlate the information of the search retrieved from the social media service to the status information of the infrastructure, wherein terms in the information of the search retrieved from the social media service are correlated to the components of the infrastructure of the service provider; and program instructions to provide the service provider with visualization of a result of correlating the information of the search retrieved from the social media service to the status information of the infrastructure.

14. The computer system of claim 13, further comprising:
program instructions to provide visualization of the information of the search, in response to receiving the information of the search from the social media service.

15. The computer system of claim 13, further comprising:
program instructions to provide visualization of the status information of the infrastructure, in response to receiving the status information of the infrastructure from the monitoring system of the service provider.

16. The computer system of claim 13, further comprising:
program instructions to feed automated search engines to the social media service.

17. The computer system of claim 13, further comprising:
program instructions to prompt a manual search at the social media service.

18. The computer system of claim 13, further comprising:
program instructions to receive a service topology model of the infrastructure from the service provider.

* * * * *